United States Patent
Oh

(10) Patent No.: US 9,538,850 B2
(45) Date of Patent: Jan. 10, 2017

(54) BED FRAME CONNECTOR

(71) Applicant: GRANTEC (XIAMEN) CO., LTD., Xiamen (CN)

(72) Inventor: Suk Kan Oh, Xiamen (CN)

(73) Assignee: GRANTEC (XIAMEN) CO., LTD., Xiamen, Fujian (CN)

( * ) Notice: Subject to any disclaimer, the term of this patent is extended or adjusted under 35 U.S.C. 154(b) by 0 days.

(21) Appl. No.: 14/857,825

(22) Filed: Sep. 18, 2015

(65) Prior Publication Data

US 2016/0302582 A1    Oct. 20, 2016

(30) Foreign Application Priority Data

Apr. 14, 2015    (CN) .................... 2015 2 0221931 U

(51) Int. Cl.
  *A47C 19/02*    (2006.01)
  *F16B 12/56*    (2006.01)
(52) U.S. Cl.
  CPC ............... *A47C 19/02* (2013.01); *F16B 12/56* (2013.01)

(58) Field of Classification Search
  CPC ................................. A47C 19/02; A47C 19/12
  USPC ............................... 5/282.1, 174, 175, 176.1
  See application file for complete search history.

(56) References Cited

U.S. PATENT DOCUMENTS 9,226,590 B1 *    1/2016    Hull ........................ F16B 12/56

* cited by examiner

*Primary Examiner* — Frederick Conley
(74) *Attorney, Agent, or Firm* — Leong C. Lei

(57) ABSTRACT

A bed frame connector is connectable between upper and lower lateral bars of a foldable bed frame. The bed frame connector includes an L-shaped plate structure that includes a straight body and an angled section extending outward from an end of the straight body. A pivot hole is formed in an end of the straight body and the angled section. The straight body includes two support blocks that project from an edge thereof intersecting the angled section. The two support blocks are positionable between and respectively abutting the upper and lower lateral bars. The present invention has a simple structure and a reduced manufacturing cost and provides secure support and smooth foldability.

6 Claims, 6 Drawing Sheets

BED FRAME CONNECTOR

TECHNICAL FIELD OF THE INVENTION

The present invention relates generally to a bed frame, and more particularly to a bed frame connector.

DESCRIPTION OF THE PRIOR ART

In a bed frame, particularly a foldable bed frame, connectors are mounted to provide necessary supporting. FIG. 1 shows a foldable bed frame, which comprises a basic bed frame assembly 1' comprising an upper frame sub-assembly 11' and a lower frame sub-assembly 12'. The upper frame sub-assembly 11' comprises two lateral bars 111' pivotally connected to a connection unit 2' and two longitudinal bars 112' connected between the two lateral bars 111'. Two longitudinal beams 113' are arranged between the two lateral bars 111' and a plurality of lateral beams 114' is arranged between the two longitudinal bars 112' to improve the supporting force that the upper frame sub-assembly 11' supports a mattress or a bed board positioned thereon. The lower frame sub-assembly 12' has two lateral bars 121' that are also pivotally connected to the connection unit 2'. In the basic bed frame assembly 1', a plurality of connectors 3' is arranged between and pivotally connected to the lateral bars 111' and the lateral bars 121' of the upper and lower frame sub-assemblies for supporting the upper frame sub-assembly 12'.

A commonly used structure of the connector comprises simply a connection plate that is directly pivoted to and arranged between the lateral bars of the upper and lower frame sub-assemblies to serve as an upright support brace. The conventional connector of a bed frame suffers insecure supporting and unsmoothness of folding and the present inventor has proposed, in Chinese Patent Publication No. CN202790059U, a bed frame connector, which is illustrated in FIGS. 1 and 2. The bed frame connector 3' comprises an L-shaped plate structure having a vertical section having an upper end in which a pivot hole 31' is formed for pivotal connection with the lateral bars 111' of the bed frame. The connector 3' has a lower end from which an angled section 32' extends. The angled section 32' has a width that substantially corresponds to a width of the lateral bars. The angled section 32' comprises a pivot hole 321' formed therein to allow for pivotal connection of the lower end of the connector 3' to the lateral bars 112'. The vertical section of the connector 3' has an inside edge having a middle portion from which a projection flange 33' extends upwards or downwards. The projection flange 33' has a length substantially corresponding to a distance between the lateral bar 111' and the lateral bar 121'. The connector 3' is included and arranged in such a way that when the connector 3' is mounted to connect and support the two lateral bars, the projection flange 33' is exactly located between the two lateral bars.

For such a structure of the connector 3', the projection flange 33' extends along the connector 3' to a length corresponding to the spacing distance between the upper and lower lateral bars. In such a structure of the connector 3', the projection flange 33' requires a large amount of material for formation and this increases the manufacturing cost.

SUMMARY OF THE INVENTION

An object of the present invention is to provide a bed frame connector, which has a simple structure and a reduced manufacturing cost and provides advantages of secure support and smooth folding.

To achieve the above object, a solution adopted in the present invention is as follows:

A bed frame connector is connectable between upper and lower lateral bars of a foldable bed frame. The bed frame connector comprises an L-shaped plate structure that comprises a straight body and an angled section extending outward from an end of the straight body. A pivot hole is formed in an end of the straight body and the angled section. The straight body comprises two support blocks that project from an edge thereof intersecting the angled section. The two support blocks are positionable between and respectively abutting the upper and lower lateral bars.

The angled section has a width substantially corresponding to a width of the lateral bars.

The pivot hole of the end of the straight body and the pivot hole of the angled section are respectively and pivotally connected to side surfaces of the upper and lower lateral bars.

The two support blocks of the connector are arranged at the same side and are each arranged perpendicular to a plane of the plate of the straight body.

The connector is connected between the upper and lower lateral bars in such a way that one of the support blocks that is located at an upper portion is positioned under the upper lateral bar and the other one of the support blocks that is located at a lower portion is positioned on and abutting the lower lateral bar.

One of the two support blocks of the connector is arranged at a location above the angled section and the other one of the support blocks is arranged at a location that is spaced from an end of the straight body by a distance corresponding to a width of the lateral bars.

With such a structure, when the bed frame is in an expanded condition, the bed frame connector connects and supports the two lateral bars and the support blocks are exactly located between the two lateral bars to provide support against forces applied to the lateral bars thereby providing a support to a weight placed on the bed frame, making the bed frame supported in a more stable manner and also helping reduce the thickness of the connector. In the present invention, the connector is structured to comprise two support blocks, also for improving the effect of securely supporting and at the same time, saving material cost. When the bed frame is folded, through the connector pivotally connected between the two lateral bars and one end of the connector forming an angled section that is coupled to a side surface of the lateral bars, folding and collecting conducted between the lateral bars can be made more smooth and the bars, after folding, are put close to each other and concentrated, making storage easy.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 5:
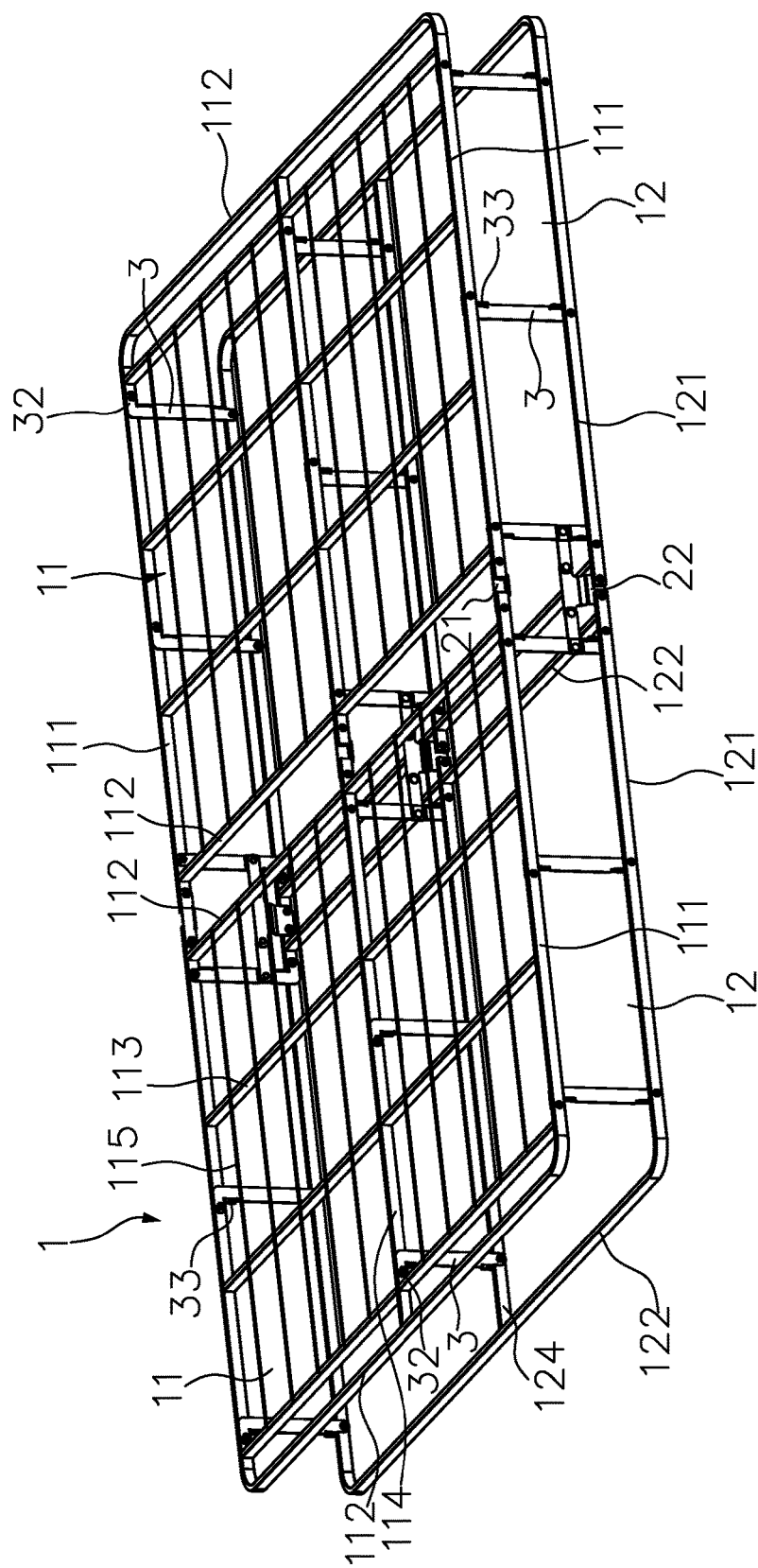
FIG. 5 is a perspective view showing a bed frame to which the bed frame connector of the present invention is applied (where the bed frame is in an expanded condition).

As shown in FIG. 5, a foldable bed frame comprises a left-side and a right-side basic bed frame assemblies 1. The two basic bed frame assemblies 1 are pivotally jointed at the middle of the bed frame. Each of the basic bed frame assemblies 1 comprises an upper frame sub-assembly 11 and a lower frame sub-assembly 12. The upper frame sub-assembly 11 comprises two lateral bars 111 and two longitudinal bars 112 connected between the two lateral bars 111. Also included are a plurality of longitudinal beams 113 arranged between two lateral bars 111 and a lateral beam 114 arranged between the two longitudinal bars 112 for increasing a supporting force that the upper frame sub-assembly 11 provides to support a mattress or a bed board placed thereon. A plurality of slender threaded rods 115 may be arranged between the two longitudinal bars 112. The lower frame sub-assembly 12 also comprises two lateral bars 121 and two longitudinal bars 122 connected between the two lateral bars 121; and a lateral beam 124 is arranged between the two longitudinal bars 122 to be located below and corresponding to the lateral beam 114. The two frames of each of the two basic bed frame assemblies 1 are pivotally jointed by means of a connection unit or a connector as shown in the drawings. In the instant embodiment, in the left-side and right-side basic bed frame assemblies, two lateral bars 111 of the two upper frame sub-assemblies 11 are pivotally connected by an upper connection plate 21 and two lateral bars 121 of the two lower frame sub-assemblies 12 are pivotally connected by a lower connection plate 22 so that the two lateral bars that are pivotally connected to the connection plate are allowed to rotate or fold toward each other.

In each of the basic bed frame assemblies 1, the lateral bars 111 and the lateral bars 121 of the upper and lower frame sub-assemblies are pivotally connected by means of a plurality of connectors 3 that serves as upright support bars to support the upper frame sub-assembly 12 in position. In the instant embodiment, in each of the basic bed frame assemblies, three connectors 3 are pivotally connected between the upper frame sub-assembly and the lower frame sub-assembly. The connectors 3 are respectively connected to two ends and a middle portion of the lateral bar 111 and the lateral bar 121 so as to provide a secure support to the upper frame sub-assembly 11.

Figure 1:
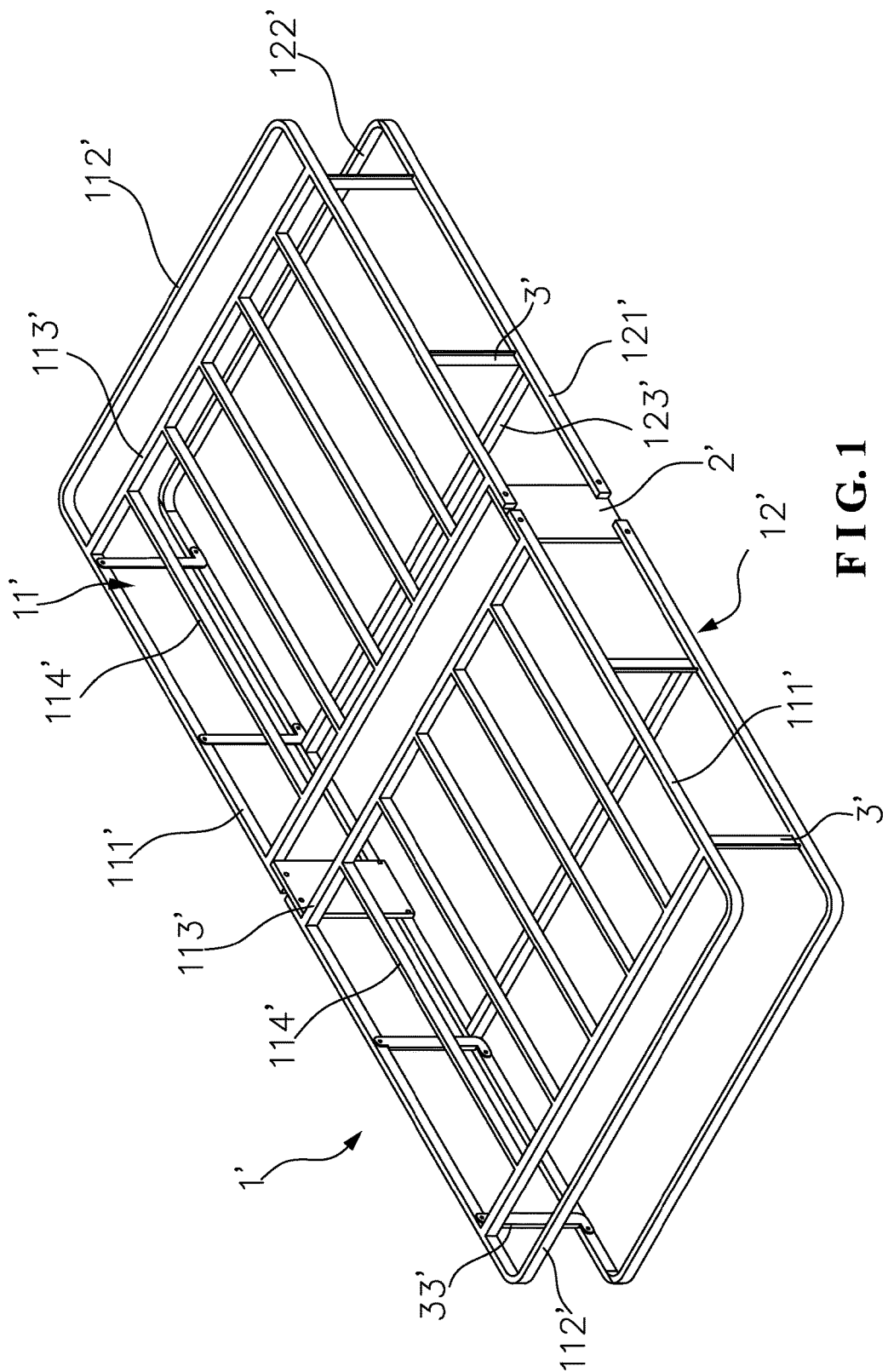
FIG. 1 is a perspective view showing the structure of a conventional bed frame.
Figure 2:
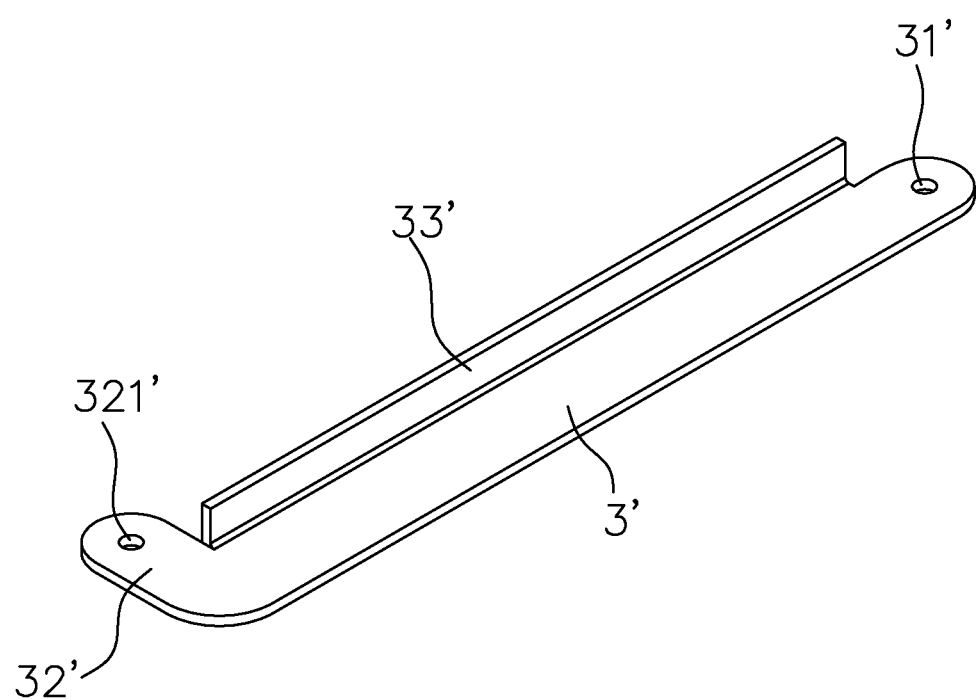
FIG. 2 is a perspective view showing the structure of a conventional bed frame connector.
Figure 3:
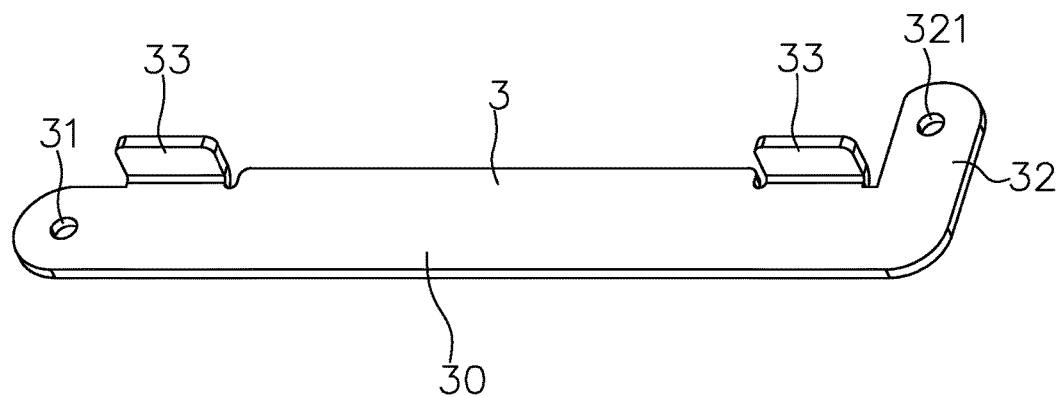
FIG. 3 is a perspective view showing a bed frame connector according to the present invention.
Figure 4:
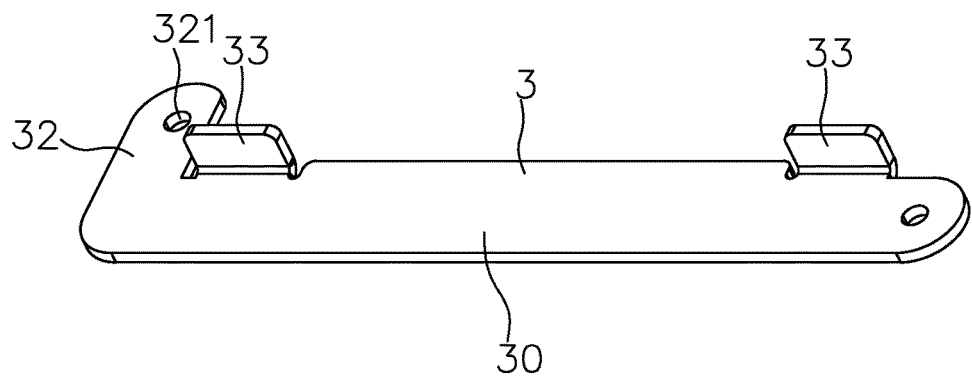
FIG. 4 is a perspective view showing a bed frame connector according to another embodiment of the present invention (where support blocks are made projecting in a different direction).

Each of the connectors 3 has upper and lower ends that are respectively and pivotally connected to the lateral bar 111 and the lateral bar 121. For the connector 3 provided in the present invention, as shown in FIGS. 3 and 4, the connector 3 has an L-shaped plate structure and the connector 3 comprises a straight body 30 having an end in which a pivot hole 31 is formed for pivotal connection with one of the lateral bars of the bed frame sub-assemblies. An opposite end of the straight body 30 forms an angled section 32 extending perpendicular therefrom. The angled section 32 has a width substantially corresponding to the width of the lateral bars. The angled section 32 comprises a pivot hole 321 formed therein to allow the opposite end of the connector 3 to be pivotally connected to the lateral bars of the upper or lower frame. The connector 3 comprises two support blocks 33 that are formed on and projecting from an edge of the straight body 30 with which the angled section 32 intersects. The two support blocks 33 are perpendicular to a plane on which the connector 3 is set. The two support blocks 33 are located on the same side and are both perpendicular to the plane of the plate of the straight body 30. The two support blocks 33 are respectively set against and abutting two lateral bars of the upper and lower frame sub-assemblies. The connectors 3 are connected between the two lateral bars in such a way that one of the support blocks 33 that is located on an upper portion is positioned under the upper lateral bar, while the other one of the support blocks 33 that is located on a lower portion is set on the lower lateral bar for supporting and positioning of the lower lateral bar. Preferably, one of the support blocks 33 is arranged at a location just above the angled section 32, while the other one of the support blocks 33 is arranged at a location that is spaced from the end of the straight body 30 by a distance corresponding to the width of the lateral bars.

Referring additionally to FIG. 5, in an expanded condition of the bed frame, the pivot holes 31, 321 at upper and lower ends of the connector 3 are respectively connected to two opposite lateral bars in such a way that the support blocks 33 positioned against and abutting the two lateral bars to provide additional supporting and positioning. Thus, the direction of projection of the support blocks 33 can be determined according to the orientation of an actual connection. FIGS. 3 and 4 illustrate example structures of the connector for suiting the need of being connected at various locations of the bed frame. The support blocks 33 can be lapped on the lateral bars of the bed frame and the lateral bars 111 and the lateral bars 121 are pivotally connected to the connector 3 that serves as supporting bars therebetween, with the connector 3 comprising the support blocks 33 formed thereon, so that when the connector 3 is arranged to connect and support the two lateral bars, the two support blocks 33 are located between the two lateral bars to provide supports against forces applied to the lateral bars thereby providing a support to a weight placed on the bed frame, making the bed frame supported in a more stable manner and also helping reduce the thickness of the connector 3 to save material cost. In the present invention, the connector is structured to comprise two support blocks 33, also for improving the effect of securely supporting and at the same time, saving material cost.

Figure 6:
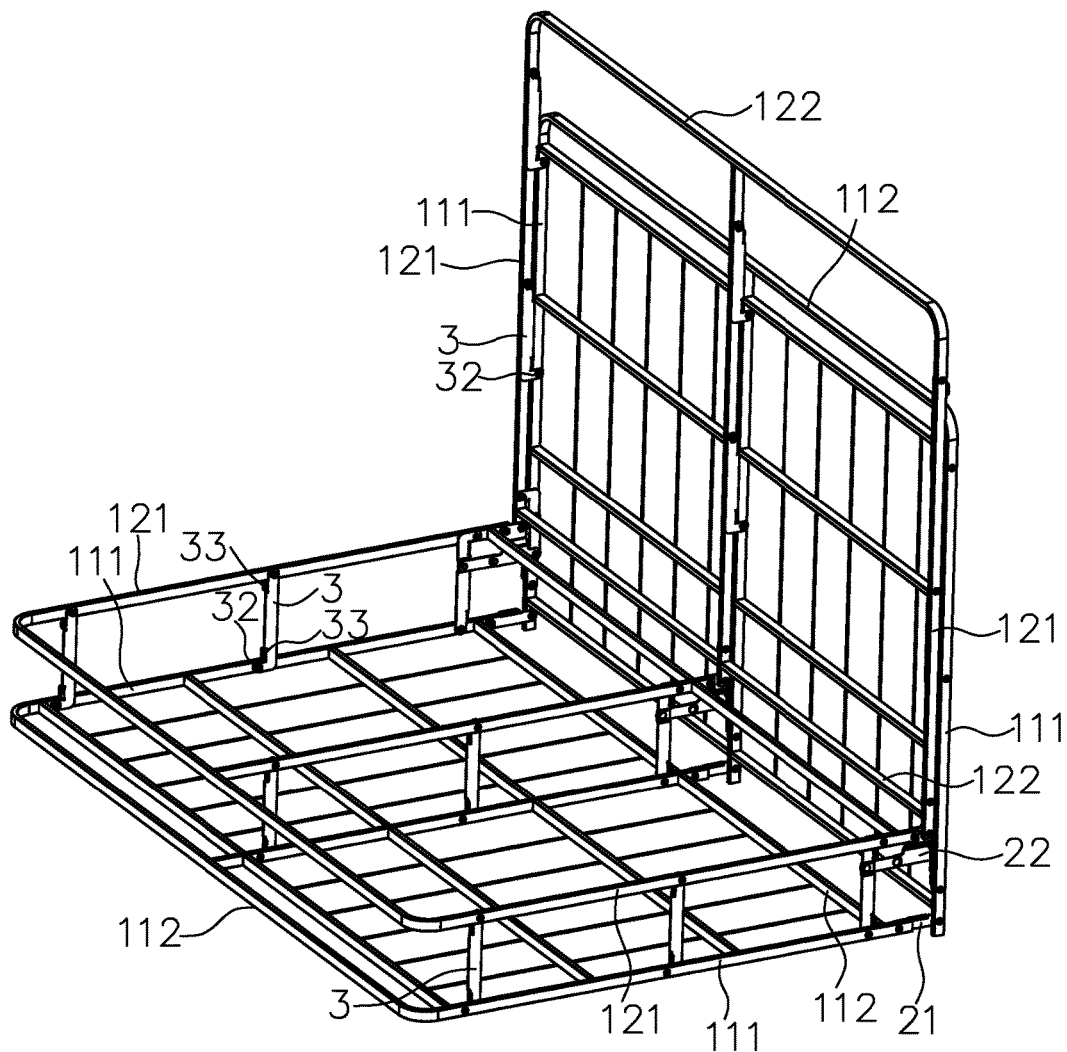
FIG. 6 is a perspective view showing the bed frame to which the bed frame connector of the present invention is applied (where the bed frame is in a partly folded condition).
Figure 7:
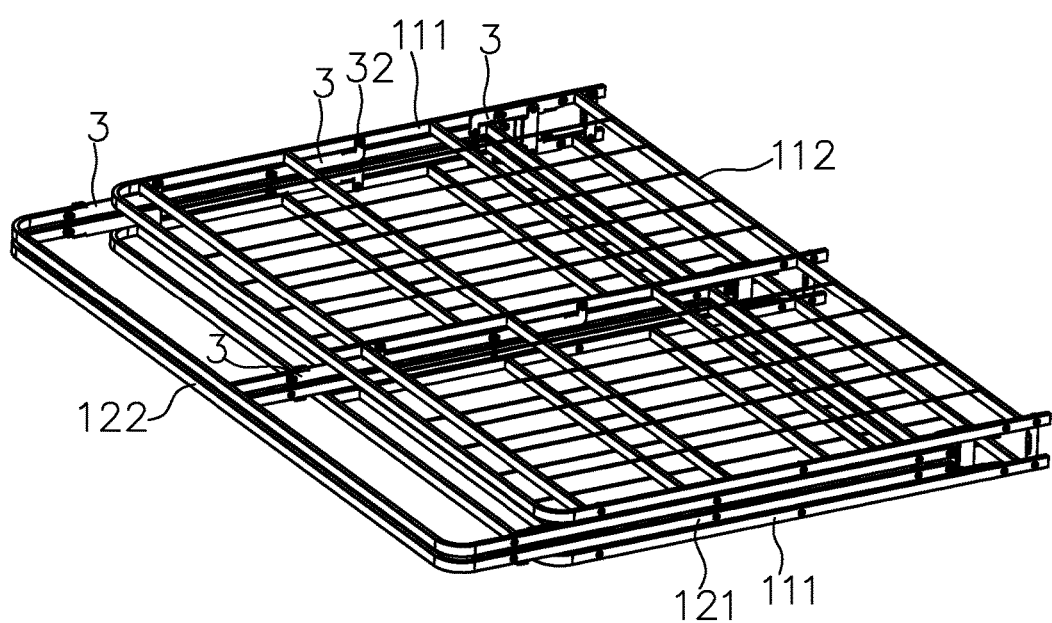
FIG. 7 is a perspective view showing the bed frame to which the bed frame connector of the present invention is applied (where the bed frame is in a folded condition).

Referring collectively to FIGS. 5-7, when the bed frame is folded, the two basic bed frame assemblies 1 are folded through the connection plates pivotally connected in the middle portion. In the folding process, the upper frame sub-assembly 11 and the lower frame sub-assembly 12 of each of the basic bed frame assemblies are folded at the same time. In the upper frame sub-assembly 11 and the lower frame sub-assembly 12, the lateral bars 111 and the lateral bars 121 are pivotally connected through the connectors 3 and each of the connectors 3 has an angled section 32 formed at one end thereof. The angled section 32 is coupled to a side surface of the lateral bar 111 or the lateral beam 114 so that folding the lateral bars can be conducted in a smoother manner and the bars, after folding, are put close to each other and concentrated, making storage easy.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A bed frame connector, connectable between upper and lower lateral bars of a foldable bed frame, wherein the bed frame connector comprises an L-shaped plate structure that comprises a straight body and an angled section extending outward from an end of the straight body, a pivot hole being formed in an end of the straight body and the angled section, the straight body comprising two support blocks that project sideways from the straight body such that at least one of the support blocks is arranged on an edge of the straight body that intersects the angled section, the two support blocks being separate and spaced from each other and positionable between and respectively abutting the upper and lower lateral bars.

2. The bed frame connector according to claim 1, wherein the angled section has a width substantially corresponding to a width of the lateral bars.

3. The bed frame connector according to claim 1, wherein the pivot hole of the end of the straight body and the pivot hole of the angled section are respectively and pivotally connected to side surfaces of the upper and lower lateral bars.

4. The bed frame connector according to claim 1, wherein the two support blocks of the connector are arranged at the same side and are each arranged perpendicular to a plane of the plate of the straight body.

5. The bed frame connector according to claim 1, wherein the connector is connected between the upper and lower lateral bars in such a way that one of the support blocks that is located at an upper portion is positioned under the upper lateral bar and the other one of the support blocks that is located at a lower portion is positioned on and abutting the lower lateral bar.

6. The bed frame connector according to claim 1, wherein one of the two support blocks of the connector is arranged at a location above the angled section and the other one of the support blocks is arranged at a location that is spaced from an end of the straight body by a distance corresponding to a width of the lateral bars.

\* \* \* \* \*